No. 800,381. PATENTED SEPT. 26, 1905.
F. E. R. MALKE.
BRIDLE BIT.
APPLICATION FILED MAR. 29, 1904.
2 SHEETS—SHEET 1.
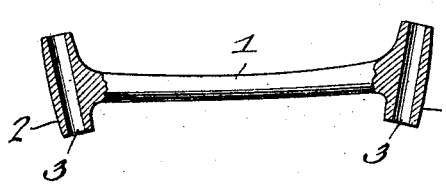
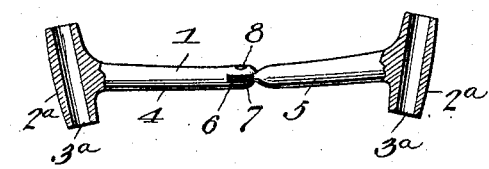
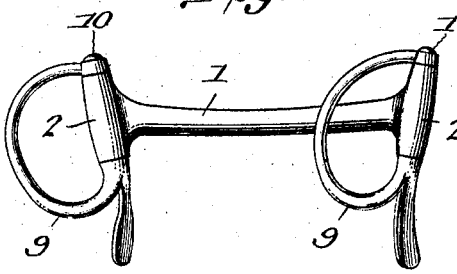
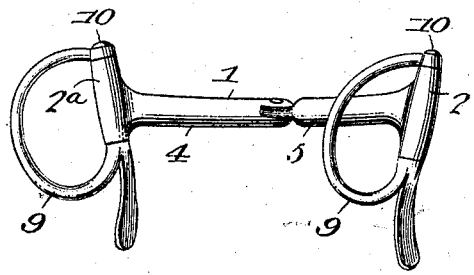
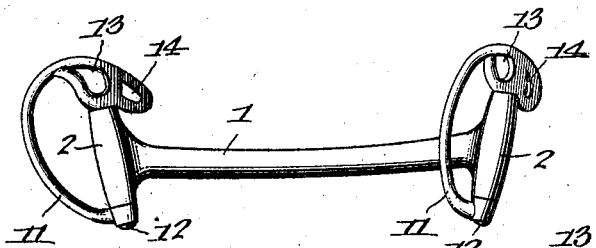
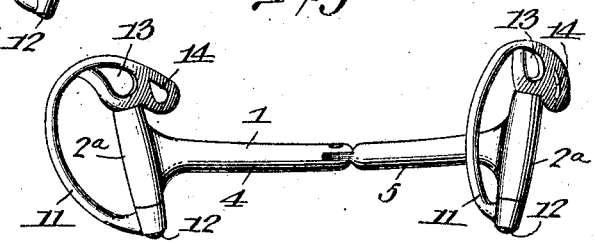
Frederick E. R. Malke, Inventor.
Witnesses
by C. A. Snow & Co.,
Attorneys

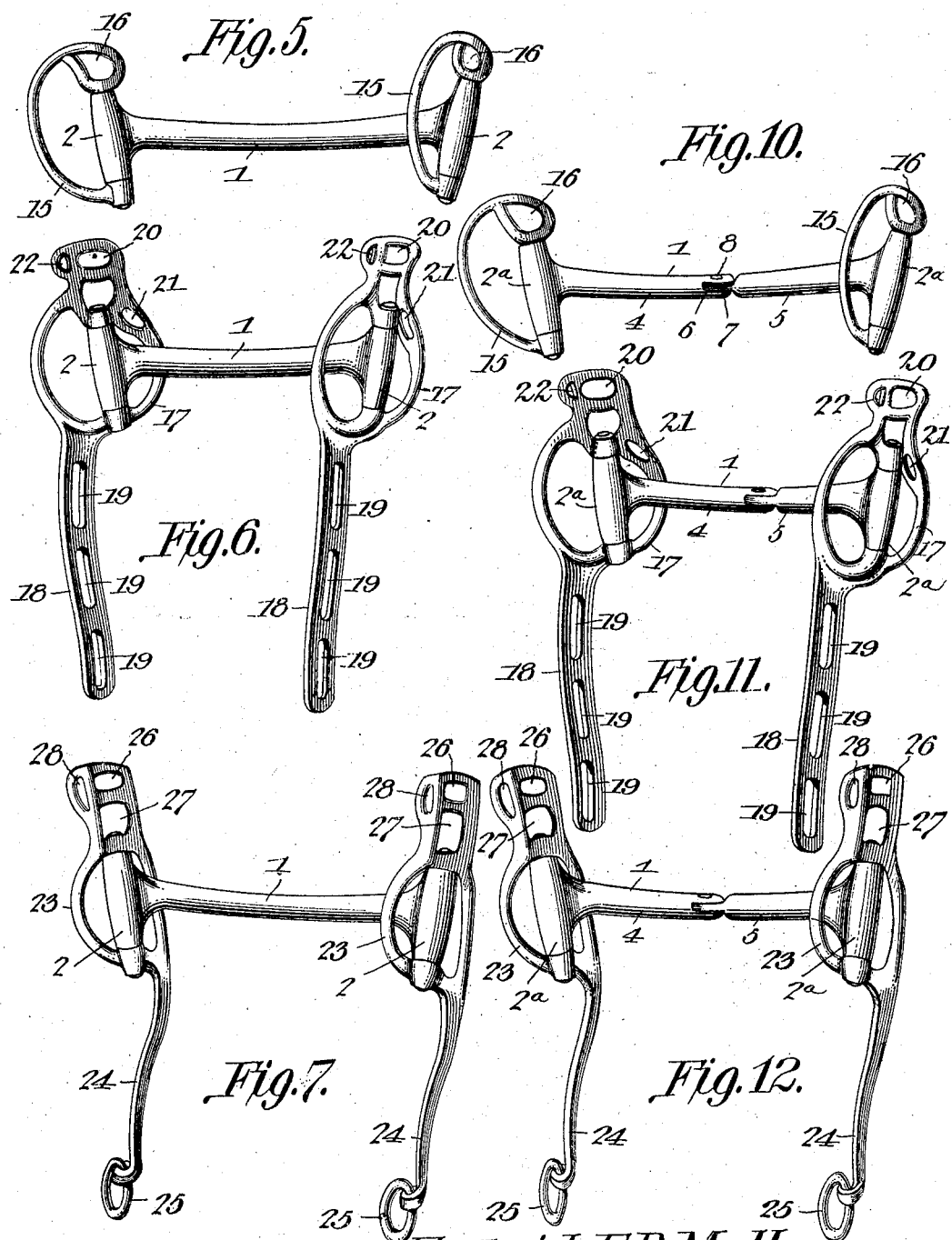

UNITED STATES PATENT OFFICE.

FREDERICK E. R. MALKE, OF CHICAGO, ILLINOIS.

BRIDLE-BIT.

No. 800,381.　　　　　Specification of Letters Patent.　　　　Patented Sept. 26, 1905.

Application filed March 29, 1904. Serial No. 200,579.

*To all whom it may concern:*

Be it known that I, FREDERICK E. R. MALKE, a citizen of the United States, residing at Chicago, in the county of Cook and State of Illinois, have invented a new and useful Bridle-Bit, of which the following is a specification.

This invention relates to bridle-bits; and it has for its object to provide a bit which shall be extremely simple in construction and capable of being manufactured at a moderate expense and which by reason of its construction shall be adapted to fit the mouth of a horse in such a manner as to obviate pressure against the cheeks and upper jaw of the animal, whereby pain is inflicted and the animal rendered restive.

A further object of the invention is to provide a bit-bar having the characteristics above referred to which shall consist of two parts or members joined flexibly together in such a manner as to be capable of flexing or bending only in what may be described as a forward and rearward direction as contradistinguished from an upward and downward direction in the mouth of the animal.

A further object is to construct a bit-bar capable of receiving and of being used in connection with a great variety of end members or fixtures adapted to be used in different ways and with different classes of harness.

With these and other ends in view, which will readily appear as the nature of the invention is better understood, the same consists in the improved construction, arrangement, and combination of parts, which will be hereinafter fully described, and particularly pointed out in the claims.

In the accompanying drawings, Figure 1 is a side elevation, partly in section, of a bit-bar constructed in accordance with the principles of my invention. Fig. 2 is a similar view illustrating a modification, which consists in constructing the bit-bar of two flexibly-connected parts or members. Figs. 3, 4, 5, 6, and 7 are representations of the bit-bar illustrated in Fig. 1 and showing the same provided with end rings or harness-attaching members of various construction. Figs. 8, 9, 10, 11, and 12 are representations of the flexible bit-bar illustrated in Fig. 2, the same being equipped with harness-attaching members corresponding with those illustrated in Figs. 3, 4, 5, 6, and 7, respectively.

Corresponding parts in the several figures are indicated by similar numerals of reference.

In the form of my invention illustrated in Fig. 1 and in Figs. 3 to 7, inclusive, my improved bit-bar 1 is a smooth, straight, or slightly-curved bar of suitable diameter and which in cross-section may be either circular or approximately elliptical. The ends of the bar 1 merge smoothly with the end members 2 2, which have been illustrated as approximately cylindrical bars diverging upwardly and converging downwardly with relation to the bit-bar 1. The end members 2 2 have been illustrated as being longitudinally perforated at 3 3 for the reception of bolts, rivets, or other suitable connecting members, whereby the necessary means for connection with the harness may be secured or attached to said end members.

Under the modified construction illustrated in Fig. 2 and in Figs. 8 to 12, inclusive, the bit-bar is composed of two separate members 4 and 5, the former of which is bifurcated at its inner end, as shown at 6, for the reception of a tongue 7, extending from the inner end of the member 5, the members being pivotally connected by means of a pin 8. The parts 4 and 5 of the bit-bar are provided at their outer ends with upwardly-diverging and downwardly-converging bars or members $2^a$ $2^a$, each longitudinally perforated, as shown at $3^a$.

In Figs. 3 and 8 have been illustrated the bit-bars illustrated in Figs. 1 and 2, respectively, the same being provided with single rings 9 at the ends thereof for the attachment of driving-reins, said rings having gaps or openings for the reception of the end members 2 and $2^a$, respectively, 10 designating the fastening members whereby said rings are connected with the ends of the bit-bars.

In Figs. 4 and 9 the bit-bars illustrated in Figs. 1 and 2, respectively, have been shown provided with end rings 11, secured by means of rivets or fastenings members 12, said rings being provided with loops 13 to receive the cheek-straps of the bridle and with loops 14 for the attachment of the ends of the checkrein.

In Figs. 5 and 10 the bars illustrated in Figs. 1 and 2, respectively, have been shown as provided with end rings 15, having single loops 16 for the attachment of the ends of the cheek-straps of the bridle.

In Figs. 6 and 11 have been illustrated the bit-bars shown in Figs. 1 and 2, respectively, provided at the ends thereof with rings 17, having side levers or cheek-pieces 18, such as are used on coach-horses, said levers being provided with slots 19 for the attachment of driving-reins. The rings 17 are formed with loops 20 for the reception of the cheek-straps of the bridle, with loops 21 for the reception of the ends of the checkrein, and with eyes or holes 22 for the reception of the curb-chain hooks. The lines or reins may be connected directly with the rings 17 or they may be adjusted in slots 19 of the levers 18 at any desired distance from the bit-bar in order that any desired leverage may be exerted upon the curb-chain when the latter is used.

In Figs. 7 and 12 have been shown the bit-bars illustrated in Figs. 1 and 2, respectively, adapted to the purposes of a riding-bit. In this case the said bit-bars are provided at the ends thereof with rings 23 of a somewhat different pattern provided with downwardly-extending levers 24, having loose rings 25 for the attachment of the curb-rein. The rings in this instance are also provided with loops 26 for connection with the cheek-pieces or cheek-straps of the bridle, said loops 26 being spaced from the rings 23 by intermediate loops 27, which are simply for the purpose of affording access to the ends of the bolts or other devices which serve to secure the rings in position upon the ends of the bit-bars. The rings are also provided with loops or eyes 28 for the reception of the curb-chain hooks. Under this construction the guiding-rein is connected directly with the rings 23.

I have described and illustrated a variety of forms of attachments which may be used in connection with either of the forms of bit-bar illustrated in Figs. 1 and 2 of the drawings. I desire it, however, to be understood that I do not limit myself to the forms or designs herein shown and illustrated, but reserve the right to use the bit-bars of my invention in connection with harness-attaching means of any description or design whatsoever, provided only that the various harness-attaching members thus used shall be constructed with parts abutting upon the ends of the obliquely-disposed members 2 2 of the bit-bar in order that proper connection may be made with said members.

Under all the various forms that my invention may assume it will be noted that the parts which extend upwardly from the end of the bit-bar diverge, so as to avoid undue pressure upon the cheeks of the animal, whereby the tender flesh will be forced against the upper teeth and lacerated or otherwise injured. On the other hand, the lower ends or downwardly-extending parts of the end members converge downwardly, so that the mouth of the animal will be under full control without danger of injury. This applies not only to the rigid but the flexible bit-bar as well, for the simple reason that the latter is capable of flexing only in a forward and rearward direction and not upwardly or downwardly against the roof of the mouth or the tongue of the animal. Much unnecessary pain is thus avoided, while at the same time the animals harnessed with my improved bits will be under perfect control.

Having thus described my invention, I claim—

1. A bit-bar having obliquely-disposed end members extending upwardly and downwardly from the ends of said bit-bar, diverging upwardly and converging downwardly, the said end members being longitudinally perforated, bolts extending through said perforated end members, and harness-attaching means engaging said bolts adjacent to the ends of the end members.

2. A bit-bar provided at the ends thereof with obliquely-disposed end members extending upwardly and downwardly from said bit-bar, the upwardly-extending portions being divergent and the downwardly-extending portions being convergent, in combination with harness-attaching means having parts abutting upon and connected with the ends of said obliquely-disposed end members.

3. A bit-bar consisting of two rigid members, a vertically-disposed pin pivotally connecting the inner ends of said members which are thereby enabled to flex forwardly and rearwardly, said hingedly-connected members being provided at their outer ends with obliquely-disposed end members diverging upwardly, converging downwardly, and perforated longitudinally; bolts extending through said longitudinal perforations, and harness-attaching means engaging said bolts adjacent to the ends of the obliquely-disposed end members.

In testimony that I claim the foregoing as my own I have hereto affixed my signature in the presence of two witnesses.

FREDERICK E. R. MALKE.

Witnesses:
 GEO. C. BOLTON,
 DAVID E. WILLIAMS.